(12) United States Patent
Barriga et al.

(10) Patent No.: US 7,296,290 B2
(45) Date of Patent: Nov. 13, 2007

(54) METHOD AND APPARATUS FOR HANDLING USER IDENTITIES UNDER SINGLE SIGN-ON SERVICES

(75) Inventors: Luis Barriga, Skarpnack (SE); Avelina Pardo-Blazquez, Madrid (ES); John Michael Walker, Madrid (ES); Jesus-Angel de Gregorio, Madrid (ES)

(73) Assignee: Telefonaktiebolget LM Ericsson (publ), Stockholm (SE)

( * ) Notice: Subject to any disclaimer, the term of this patent is extended or adjusted under 35 U.S.C. 154(b) by 554 days.

(21) Appl. No.: 10/504,954

(22) PCT Filed: Feb. 28, 2003

(86) PCT No.: PCT/SE03/00341

§ 371 (c)(1),
(2), (4) Date: Aug. 17, 2004

(87) PCT Pub. No.: WO03/073242

PCT Pub. Date: Sep. 4, 2003

(65) Prior Publication Data

US 2005/0154913 A1    Jul. 14, 2005

(51) Int. Cl.
*H04L 29/00* (2006.01)
(52) U.S. Cl. .......................................................... 726/8
(58) Field of Classification Search .................... 726/8
See application file for complete search history.

(56) References Cited

U.S. PATENT DOCUMENTS 6,421,768 B1    7/2002    Purpura

| | | | |
|---|---|---|---|
| 6,678,731 B1 * | 1/2004 | Howard et al. | 709/225 |
| 6,892,307 B1 * | 5/2005 | Wood et al. | 726/8 |
| 7,039,714 B1 * | 5/2006 | Blakley III et al. | 709/229 |
| 2003/0061512 A1 | 3/2003 | Flurry et al. | |
| 2003/0115267 A1 * | 6/2003 | Hinton et al. | 709/204 |
| 2003/0154401 A1 * | 8/2003 | Hartman et al. | 713/201 |

FOREIGN PATENT DOCUMENTS

| | | |
|---|---|---|
| EP | 1 089 516 A | 4/2001 |
| GB | 2 349 244 A | 10/2000 |
| WO | WO 01 72009 A | 9/2001 |

* cited by examiner

*Primary Examiner*—Kambiz Zand
*Assistant Examiner*—Andrew L Nalven

(57) ABSTRACT

An apparatus and method for providing Single Sign-On services to a user when accessing a selected Service Provider from a plurality of Service Providers. An Authentication Provider authenticates the user at with a user-identity, provides the user with a token as proof of the authentication, and assigns a temporary alias-identity to the user for use when the user accesses the selected Service Provider. The Authentication Provider and the selected Service Provider link the assigned alias-identity and the user-identity to identify the user at respective sites. The user accesses the selected Service Provider by presenting the token along with a local user-identity valid for the selected Service Provider. When the user attempts a subsequent access at the selected Service Provider, the user is identified by the shared alias-identity, if the user allowed permanent linking. If the user did not allow permanent linking, the process is repeated for each subsequent access.

15 Claims, 7 Drawing Sheets

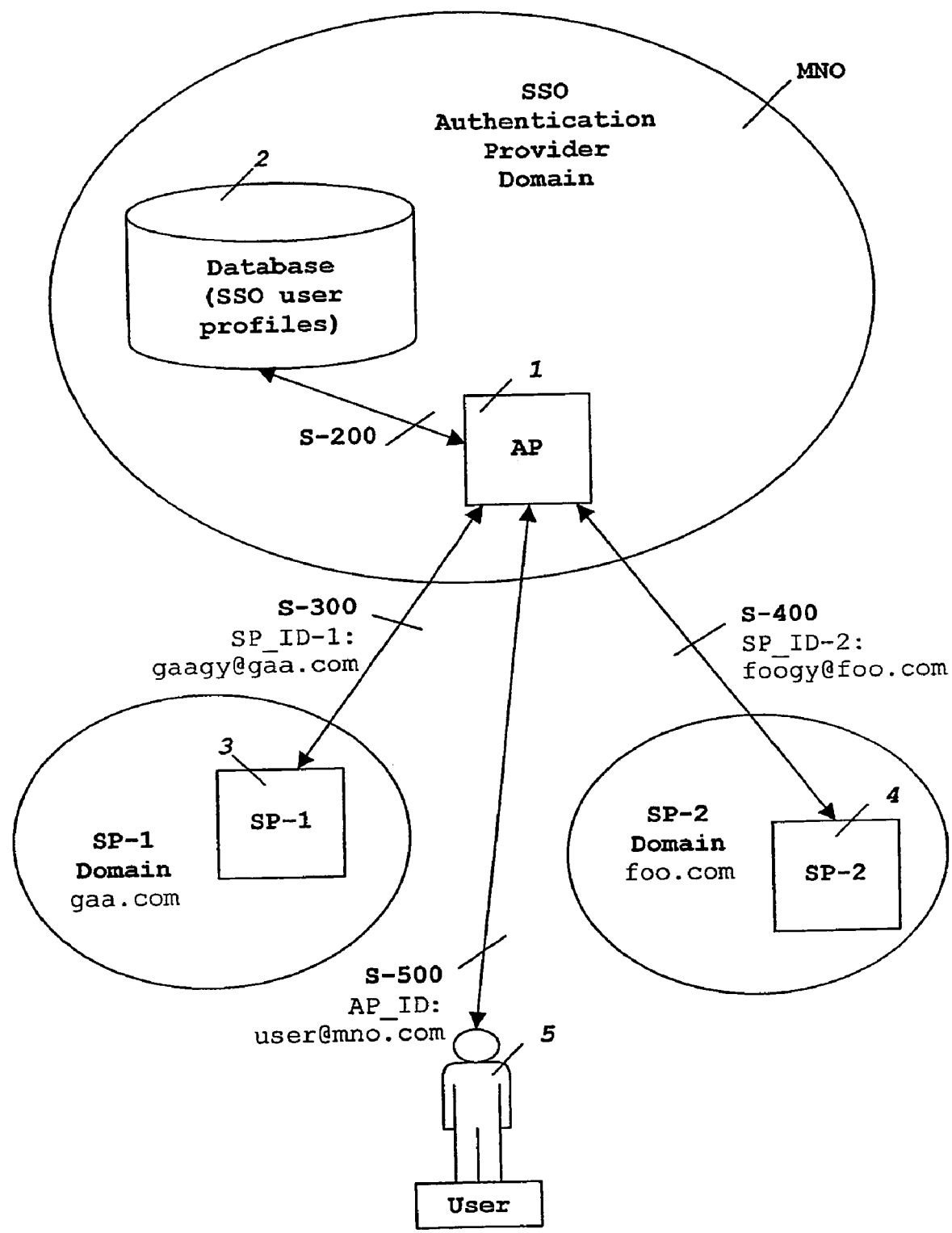
FIG.-1-
Related Art

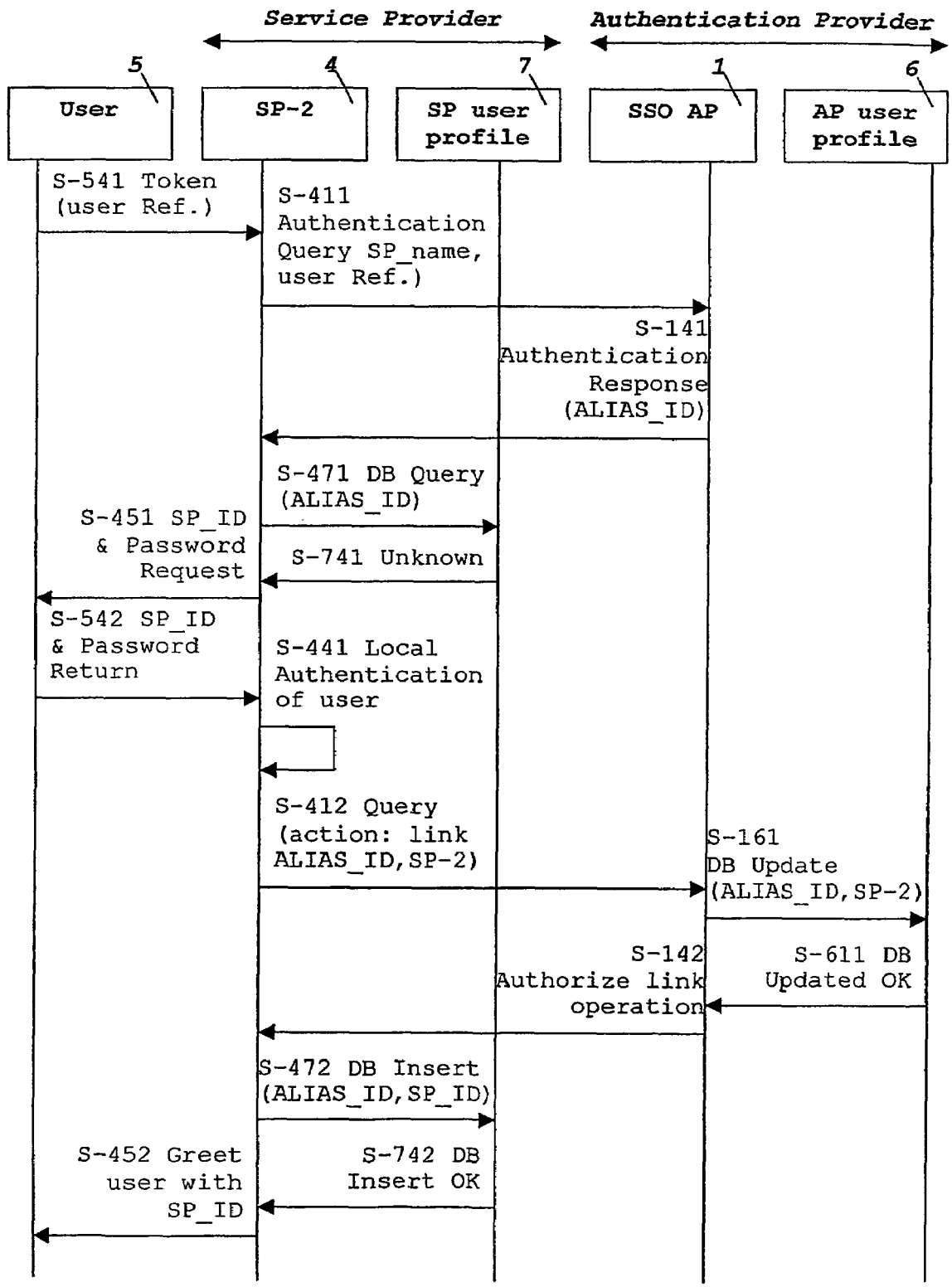
FIG.-2-

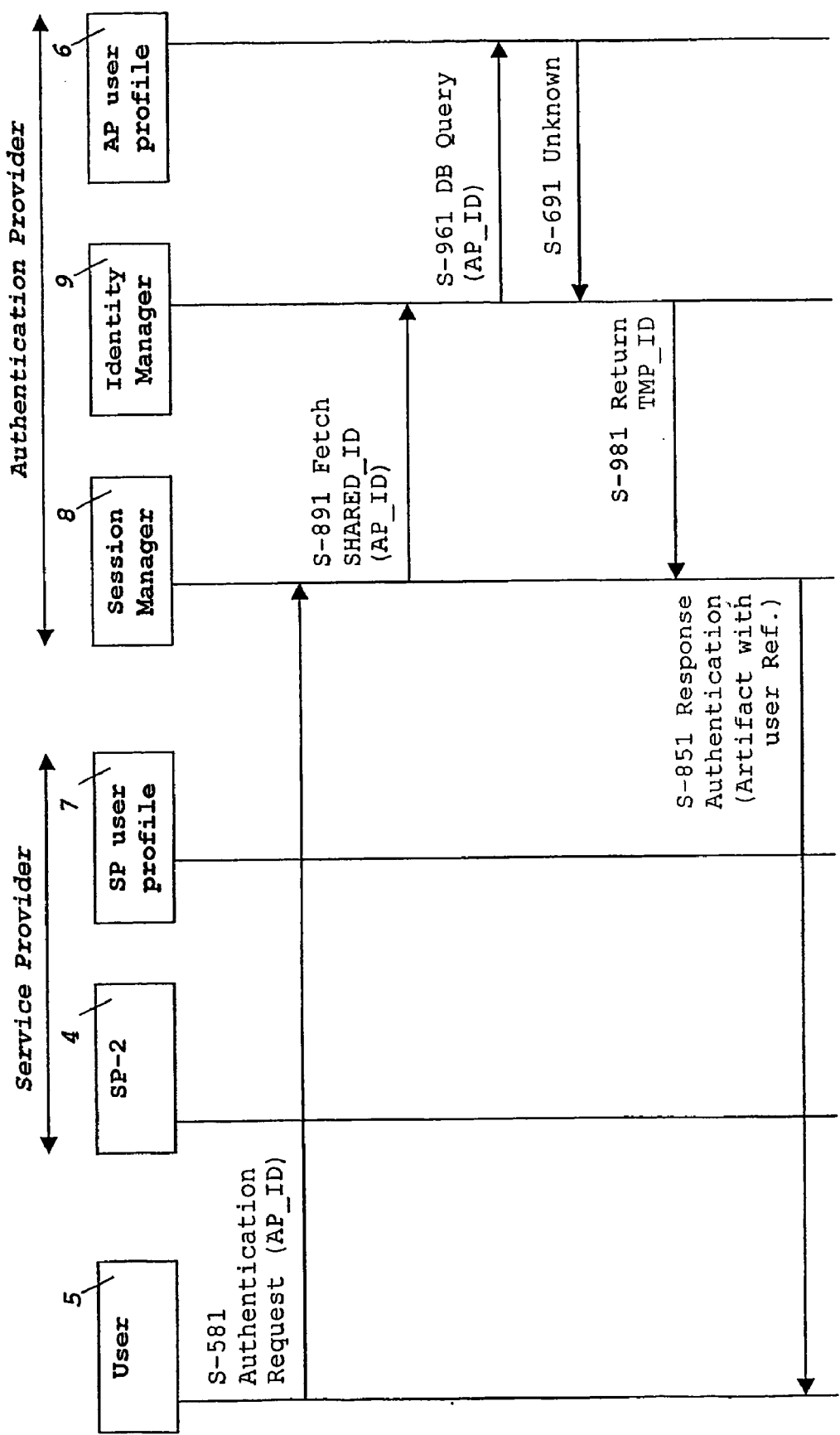
FIG. -3A-

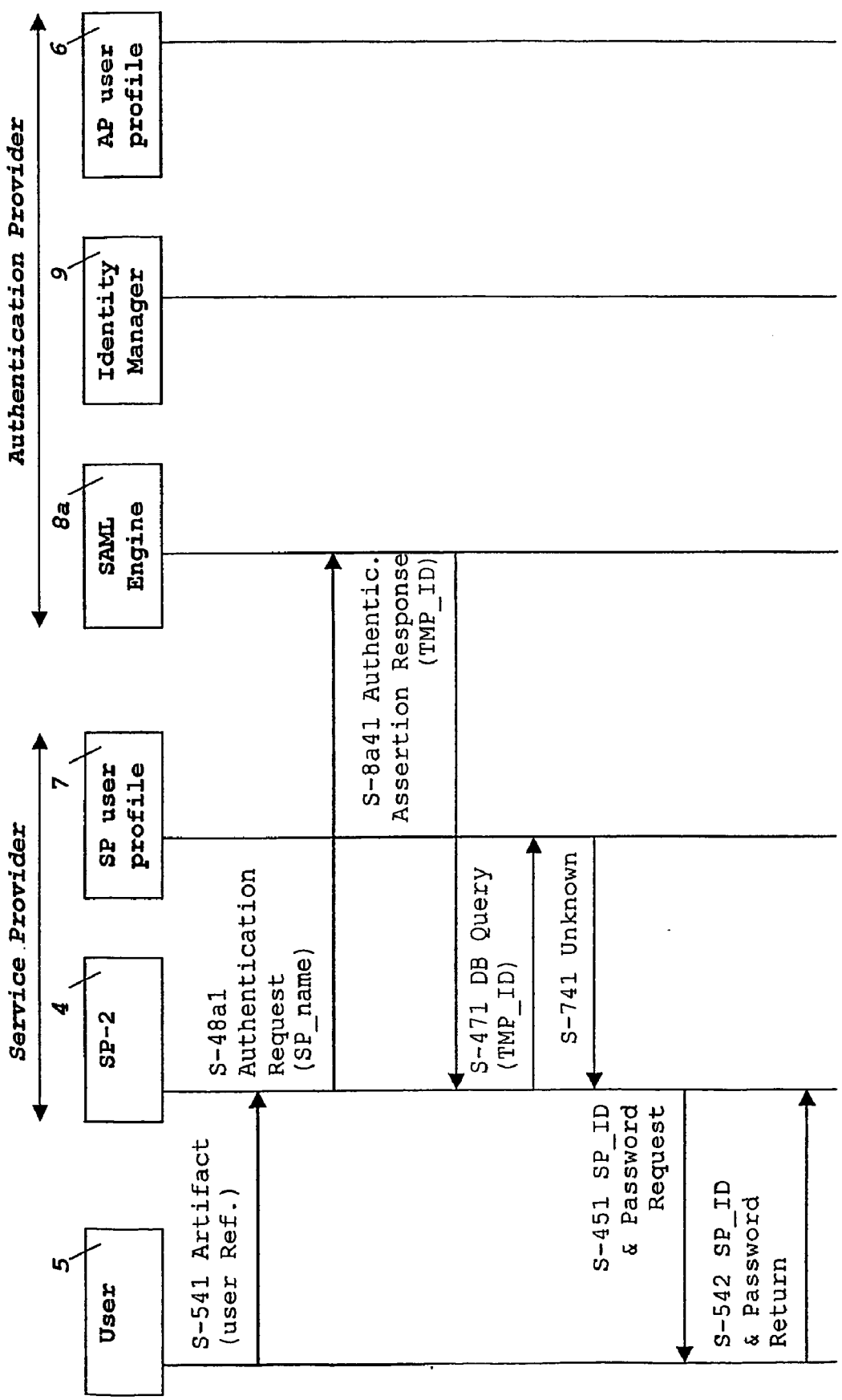
FIG. -3B-

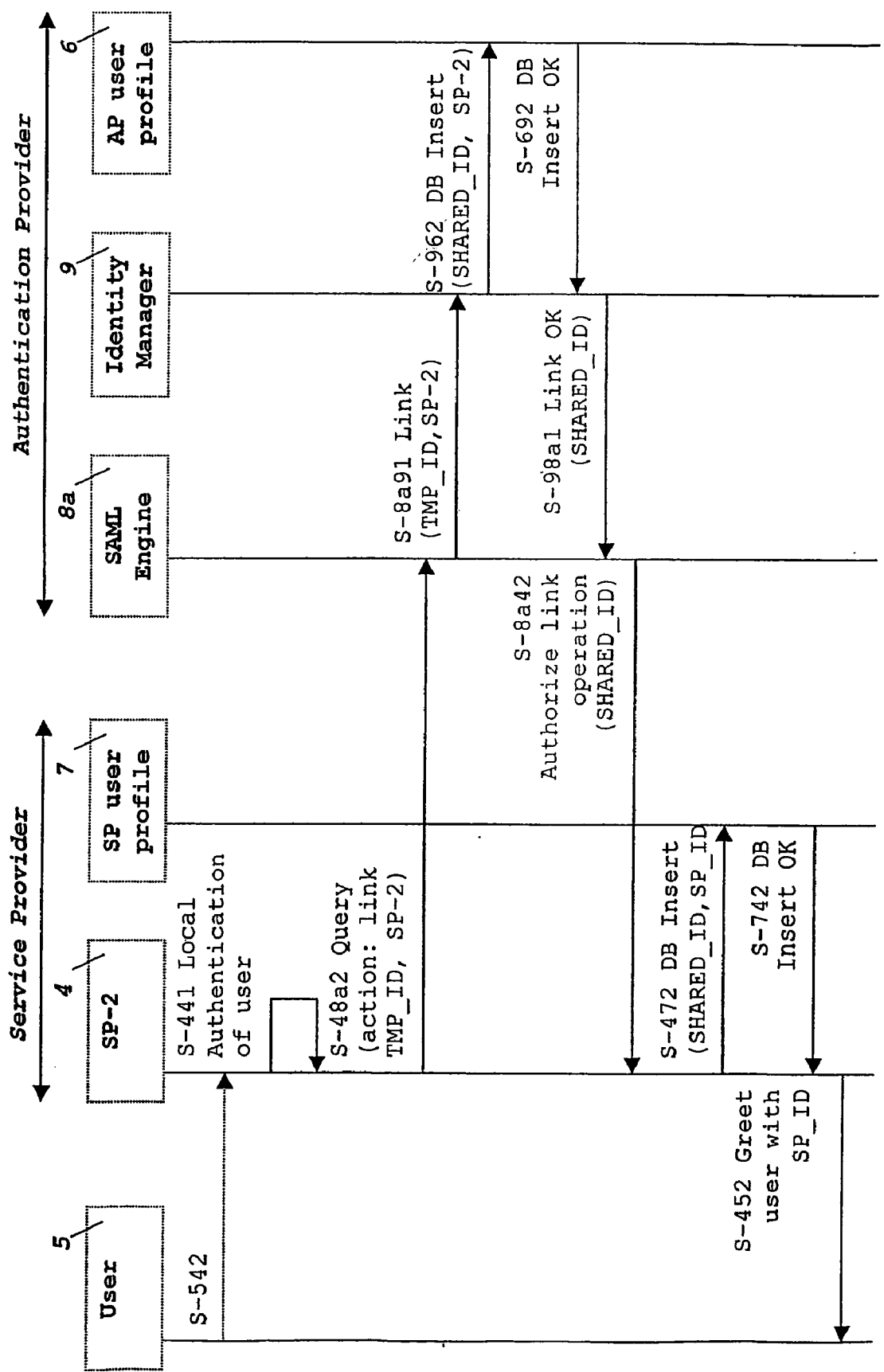
FIG. -3C-

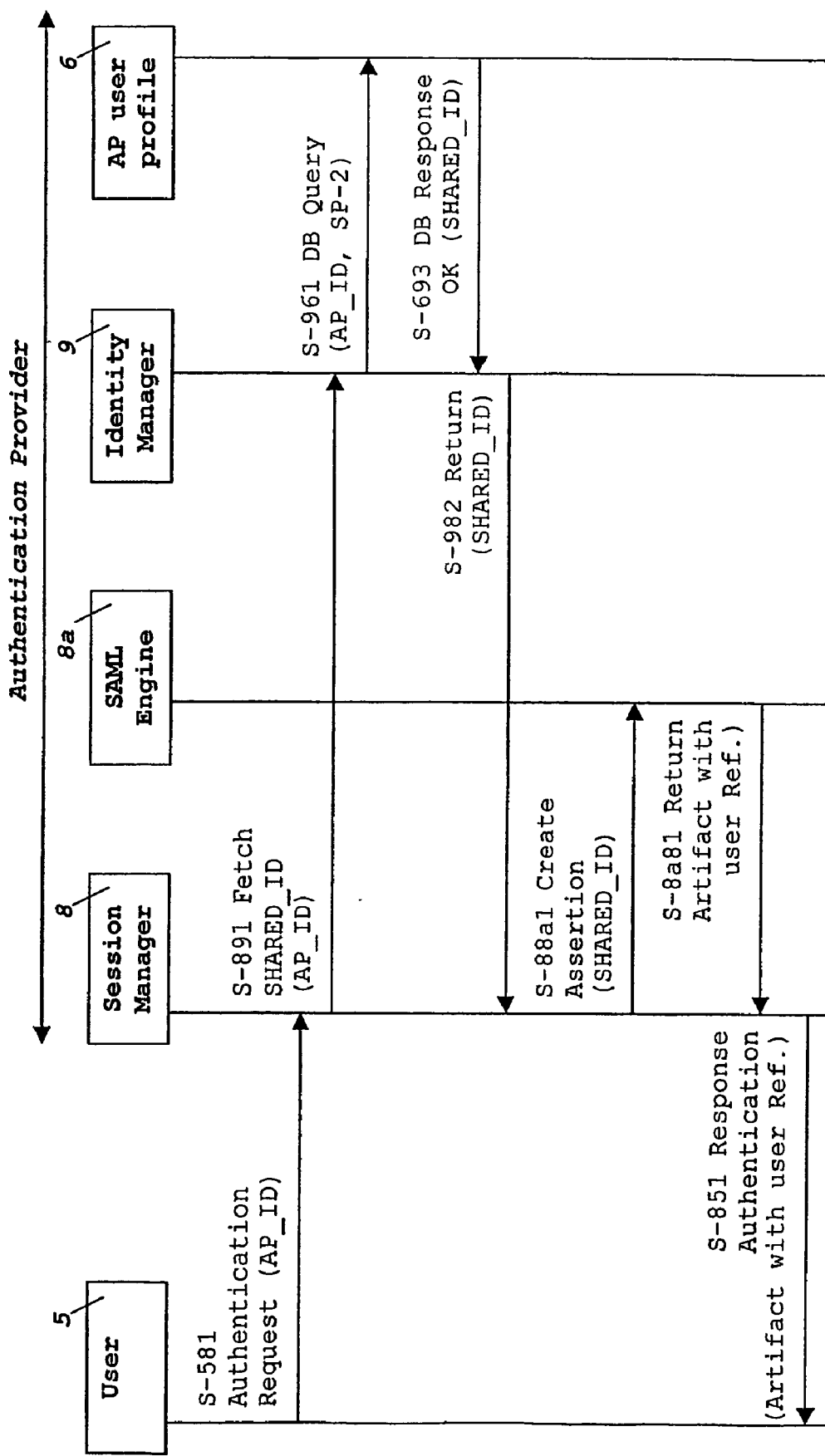
FIG.-4-

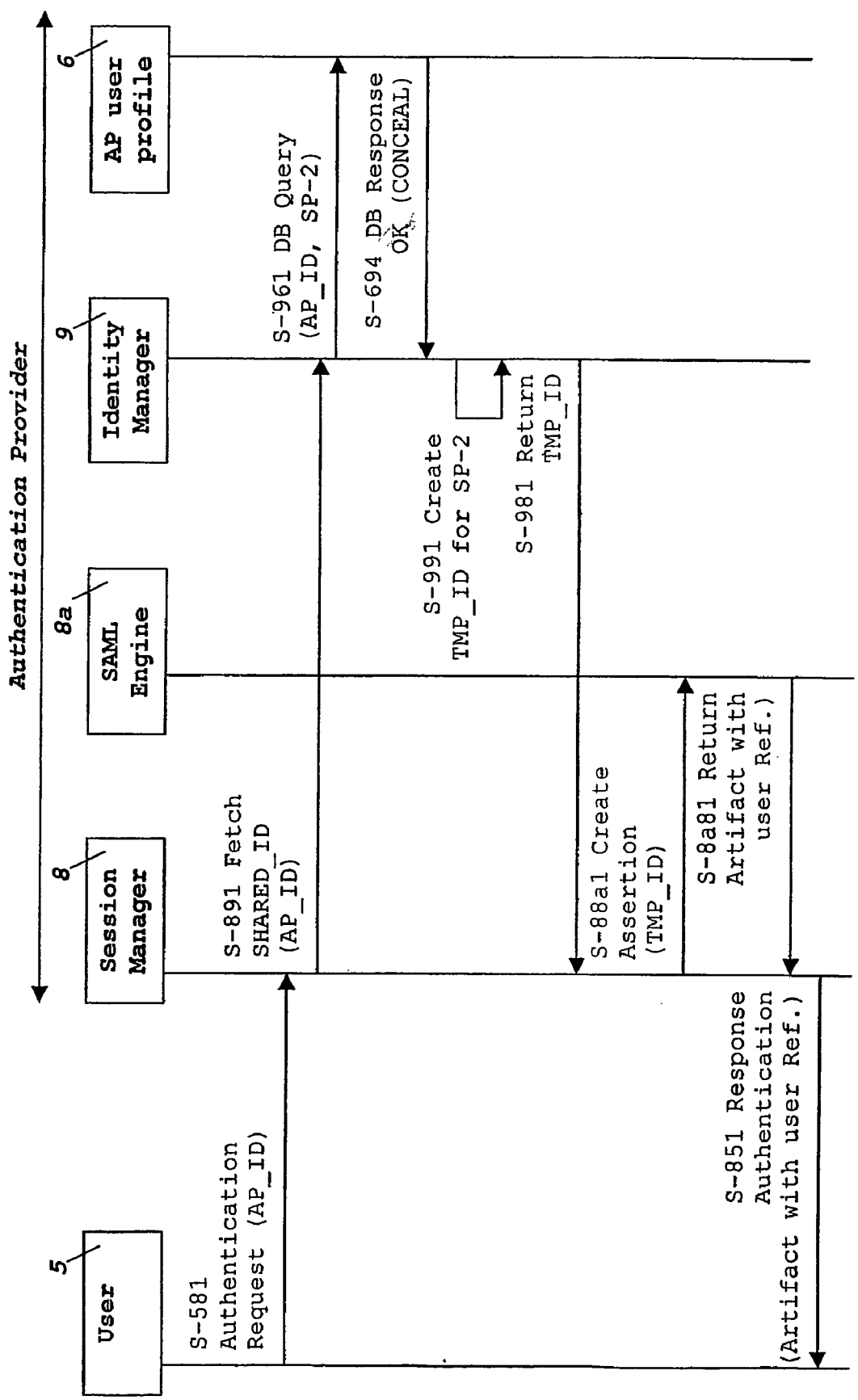
FIG. -5-

METHOD AND APPARATUS FOR HANDLING USER IDENTITIES UNDER SINGLE SIGN-ON SERVICES

FIELD OF THE INVENTION

The present invention generally relates to Single Sign-On services for a user having a plurality of user identities. More particularly, the invention pertains to means and methods for handling a plurality of user identities that a user may have under different service providers, while allowing a Single Sign-On authentication for the user.

BACKGROUND

The Internet is a growing network wherein services are provided by different organisations generally known as service providers. Many service providers allow users the possibility to have accounts with them. Indeed, depending on the service offered, it is often required to have an account at a given service provider. The access to a given service provider may require users to authenticate themselves towards the service provider. In other words, users must be able to prove who they are. This is most often achieved by providing an identity, namely a username, and a password. Once a user is authenticated, she or he is allowed to access a requested service as well as an account that the user may have at the service provider. In this context, a user's account is understood as personal and confidential information. At present, users may have a number of identities and passwords at different service providers, each couple identity/password being used to authenticate a user at a service provider.

The advent of Internet services has brought with them a new service that allows users to access said Internet services in an easy and convenient manner, the so-called Single Sign-On (SSO) service. The current principle behind Single Sign-On states that users shall be able to authenticate once and shall be given access to all their subscribed services that accept such level of authentication. Single Sign-On is an emerging service that enables users to access different service providers without requiring a particular user's authentication at each service provider. In other words, a user provides identity/password only once at a given service provider and the resulting authentication is valid for entrance to other service providers.

Conventional cellular operators, hereinafter referred to as Mobile Network Operator (MNO), make use of authentication services to grant subscribers accesses to voice and data services provided by such operators. As cellular operators move up in the value chain, they could leverage their mutual trust relationship with their own subscribers in order to play a new role of Authentication Providers for their respective subscriber population in emerging business models wherein service domain and authentication domain belong to different administrative entities. In this respect, an operator that is able to provide both accesses, namely IP connectivity and services, might additionally offer to its subscribers an "access authentication SSO" so that an authentication performed at the access domain may be a valid authentication in a service domain. Generally speaking, an Authentication Provider may belong to the same administrative domain as the Service Provider offering the service, or may be delegated to an external trusted party such as a cellular operator.

Single Sign-On (SSO) is thus based on trust. That is, a first service provider trusts another party, which in particular might be a second service provider carrying out a Single Sign-On (SSO) authentication, to authenticate a user who is accessing a site of said first service provider. The first service provider has no way of knowing whether or not said user already has an account with it and, if so, under which user identity. This occurs because the identity furnished by the user at an accessed site does not necessarily match the identity furnished during the Single Sign-On (SSO) authentication process. Indeed, if such user identity furnished during the SSO authentication process matches an existing user identity for the user at the accessed site of said first service provider, then direct access to related accounts may be granted, but this is merely a coincidence and can not be considered a valid mechanism within a generally applicable method.

The present invention is aimed to solve a more general case in which users are known under different identities for accounts scattered across the Internet, thus allowing a Single Sign-On (SSO) authentication provider to correlate user identities and the users making use of a user's preferred identity per each service provider as well as accessing a service provider in an anonymous manner despite performing a Single Sign-On (SSO) authentication.

A primary object of the present invention is the support of an appropriate mechanism, in terms of means and method, for handling, provisioning and correlating a plurality of user identities for a user in an automated manner between an SSO Authentication Provider, such as a Mobile Network Operator (MNO) or a first service provider capable of performing an SSO authentication, and a number of second Service Providers in order to allow each user having a personalised access to its user's accounts at said second Service Providers.

RELATED ART

The international publication WO-200160013 shows a Single Sign-On process that allows a mobile user with a mobile phone or with a laptop to remotely access a remote server. This teaching only deals with SSO authentication for users in a mobile or cellular network by stressing role of a smart card. There is no support in this publication for handling, provisioning and correlating a plurality of user identities for a user in an automated manner between an SSO Authentication Provider and a number of Service Providers.

On the other hand, the international publication WO-200111450 just presents a Single Sign-On framework with a trust-level mapping to authenticate requirements for improving the security of information transactions over a number of networks. This teaching only deals with authentication in a generic SSO solution wherein there is no need for handling, provisioning and correlating a plurality of user identities for a user in an automated manner between an SSO Authentication Provider and a number of Service Providers.

Another significant instance of methods and system for Single Sign-On user access is described in the European patent application EP-1089516 to Grandcolas et al. wherein users may gain access to multiple web servers. This application describes how a user is authenticated at a first web server that allows the user to select a second web server offering a desirable service. When the user effectively selects the second web server, the first web server constructs an encrypted authentication token, and transmits it to the second web server. The second web server authenticates the received token and allows the user to have a session at this second web server. Both first and second web server share, in accordance with this application, a sub-domain. That is, the scenario in this application is an instance where the Authentication Provider, namely the first web server, and the Service Provider, namely the second web server, both belong to the same administrative domain. Thereby, the teaching in this application cannot be applied to those scenarios where Authentication Provider and Service Provider belong to different administrative domains. Moreover, this approach can not be applied in scenarios where there is a need for handling, provisioning and correlating a plurality of user identities for a user in an automated manner between an SSO Authentication Provider and a number of Service Providers.

Another known solution nowadays under Single Sign-On services, and which is representative of a scenario where Authentication Provider and Service Provider belong to different administrative and commercial domains, is the Microsoft® .NET Passport product (as described in http://www.passport.com and hereinafter simply referred to as ".NET Passport"). This product is intended to build up a broader Internet trust network with a common set of technical and operational guidelines open to organizations supporting the corresponding standards. However, this approach does not solve the problem of handling, provisioning and correlating a plurality of user identities for a user in an automated manner between an SSO Authentication Provider and a number of Service Providers, especially for user identities scattered throughout the Internet and for Service Providers not associated to ".NET Passport" or not following the corresponding standards.

A currently known approach, which may apply in an SSO scenario wherein a user makes use of different user identities for different service providers, assumes that a user has an agreement with an SSO Authentication Provider such as a Mobile Network Operator holding a subscription for said user. In this scenario, as FIG. 1 illustrates, an SSO Authentication Provider stores the following user information per user basis:

- one valid single sign-on identity that is used for authentication purposes (hereinafter AP_ID) and as entry key to access a given profile; and
- a number of specific user identities per service provider web site basis (each user identity hereinafter referred to as SP_ID), each SP_ID being accessed via the aforementioned AP_ID.

In this approach, the SSO Authentication Provider authenticates a user towards a number of service providers. The user provides an identity (AP_ID) and password to be authenticated once and accesses other web sites as an authenticated user. If the user has other user identities with other Service Providers the user must manually input the list of these other identities (SP_ID-1, SP_ID-2) at the trusted SSO Authentication Provider. In this way, each Service Provider addresses a user with the identity said user is known locally at the Service Provider and not with the AP_ID used for being authenticated.

A first disadvantage from this approach is that users, or rather the SSO Authentication Provider owner, have to manually input a number of user identities that the user has with other Service Providers at the trusted SSO Authentication Provider. That is, there is no automated method and corresponding means to provide a reliable solution for inter-domain provisioning and for handling identity related information of an end-user in a Single Sign-On (SSO) context. Inter-domain may refer in this context to interactions between an SSO Authentication Provider, such as for example a Mobile Network Operator (MNO), and a number of Service Providers (SP-1, SP-2) accessible over the Internet. In this respect, no solution currently exists that allows different user identities belonging to different domains to be automatically linked and provisioned by both the SSO Authentication Provider and a Service Provider.

An important drawback from the above approach is the fact that an SSO Authentication Provider domain stores, and thus knows, a number of user identities for each user with different Service Providers, the latter belonging to other domains. This drawback implies disadvantages on both sides, on the one hand, the SSO Authentication Provider domain stores and handles user identities owned by Service Providers domains and, on the other hand, privacy of users and Service Providers is, at least, compromised.

Thereby, an important object of the present invention is the provision of means and methods for allowing that different user's identities of a user, the user's identities belonging to different domains, can be automatically linked and provisioned by both the SSO Authentication Provider and a Service Provider. It is another object of the present invention that, apart from maintaining the required security of users authentication, privacy of users and Service Providers is not compromised. It is a further object of the present invention to provide a mechanism for users accessing a Service Provider in an anonymous manner after having been authenticated in an SSO Authentication Provider domain, the mechanism in conformity with the means and methods of the above objects.

SUMMARY OF THE INVENTION

To accomplish the above objects, and other advantages, there is provided in accordance with the invention a method of providing Single Sign-On services to a user accessing at least one Service Provider, the user having a number of local user identities for accessing a number of Service Providers. This method comprising a step of authenticating the user at an Authentication Provider with a user identity used for authentication purposes; and further comprising the steps of:

- assigning at the Authentication Provider a temporary alias identity to the user for the first time the user access the said at least one Service Provider identified by a given Service Provider identifier;
- linking, on permanent basis if allowed by the user or on temporary basis otherwise, respective user identities at the Authentication Provider and at the said at least one Service Provider, both sharing and uniquely exchanging the alias identity to identify the user at respective sites; and
- for a next time the user access the said at least one Service Provider, identifying the user by the shared alias identity if permanent linking was allowed by the user, or repeating the step of assigning a temporary alias identity to the user otherwise.

In this method, the step of linking respective user identities on permanent or on temporary basis includes a step of checking corresponding user's preferences at an Authentication Provider user's profile, and a step of asking the user for a local identity and password to identify the user locally at the Service Provider. An important advantage is obtained with this method applied for a user not having yet an account with the Service Provider, the user selecting a local identity and password, and the Service Provider registering a new account for the user with said Service Provider.

Moreover, the above step of linking respective user identities on permanent basis includes a step of linking at the Authentication Provider the user identity used for authentication purposes, the assigned alias identity and a given identifier of the Service Provider where the user accesses;

and a step of linking at the Service Provider, where the user accesses, the local user identity and the alias identity assigned.

Another additional advantage is obtained, in case accessing users may be authenticated with different Authentication Providers, when the step of linking the local user identity and the alias identity at the Service Provider also comprises a step of linking an identifier of the Authentication Provider in charge of each user.

Apart from the above method, there are provided an Authentication Provider and a Service Provider arranged in accordance with the invention to accomplish the above objects and other advantages.

The Authentication Provider arranged for carrying out a Single Sign-On authentication of a user accessing at least one Service Provider, and arranged for returning an authentication token or artefact to the user as a result of the authentication, the user having a user's identity used for authentication purposes. This Authentication Provider comprising:

means for assigning a temporary alias identity to the user, for the first time the user access the said at least one Service Provider identified by a given Service Provider identifier; and
  means for linking the user identity used for authentication purposes, with the assigned alias identity and the given identifier of the Service Provider where the user accesses.

An advantageous Authentication Provider comprises a Session Manager having means for checking if a user identified by a user's authentication identity has an active session, means for checking if there is a shared alias identity for the user with a session in a Service Provider, and means for ordering the generation of an authentication assertion with said shared alias identity for the user. This advantageous Authentication Provider also comprises a Security Assertion Mark-up Language (SAML) engine having means for generating an authentication assertion with a shared alias identity for a user.

Additional advantages may be obtained by having an Authentication Provider that comprises an Identity Manager having means for determining whether a shared alias identity exists for a user in a Service Provider, means for assigning a new shared alias identity for said user, and means for linking a shared alias identity for the user in a Service Provider with an identifier of said Service Provider and with a user's authentication identity. Moreover, this Identity Manager having further means for determining user's preferences for a user in respect of linking user's identities.

Further advantages may be obtained from this Authentication Provider by having therein a user's profile directory (6) with storage for linking user's identities with identifiers of Service Providers.

The Service Provider, in accordance with the invention, having means for receiving a service request from an accessing user, the service request including an authentication artefact for the user, means for verifying the authentication artefact with an Authentication Provider having generated the artefact, and means for obtaining from a user a local user's identity to identify a user's account with the Service Provider. The Service Provider comprising:

means for obtaining from an Authentication Provider a shared alias identity for the user; and
  means for linking the local user's identity with the received shared alias identity.

An additional advantage is obtained, in case the accessing users may be authenticated with different Authentication Providers, with the Service Provider further comprising means for linking an identifier of the Authentication Provider with the local user's identity and with the received shared alias identity.

Further additional advantages are obtained with this Service Provider comprising means for registering a new user's account with the Service Provider for a user not having a local user's identity assigned to any account with the Service Provider.

In both, the above apparatus and method, a user is identified between an Authentication Provider and a Service Provider with a shared identity, independently of the authentication identity used between the user and the Authentication Provider, and independently of the user identity used between the user and the Service Provider.

BRIEF DESCRIPTION OF DRAWINGS

The features, objects and advantages of the invention will become apparent by reading this description in conjunction with the accompanying drawings, in which:

FIG. 1 schematically represents a Single Sign-On scenario in which users manually input their specific user identity per service provider into an authentication provider's database.

FIG. 2 shows a simplified sequence diagram representing the process of linking identities between a Service Provider and an SSO Authentication Provider in accordance with an aspect of the invention.

FIG. 3A shows another simplified sequence diagram representing the process followed in accordance with an embodiment of the present invention to authenticate a user having a user's identity for authentication purposes in an authentication provider.

FIG. 3B-3C illustrate an exemplary process of linking identities between a Service Provider and an SSO Authentication Provider in accordance with another embodiment of the present invention.

FIG. 4 shows an exemplary process for identity selection during a user's authentication carried out at a corresponding Authentication Provider site in accordance with an embodiment of the invention.

FIG. 5 illustrates an exemplary generation of a user's Temporary Identity for an anonymity service during a user's authentication carried out at a corresponding Authentication Provider site in accordance with an embodiment of the invention.

DETAILED DESCRIPTION OF PREFERRED EMBODIMENTS

The following describes currently preferred embodiments of means, and methods for handling, provisioning and correlating a plurality of user identities for a user in an automated manner between an SSO Authentication Provider and a number of Service Providers in order to allow each user having a personalised access, including anonymous access, to said Service Providers where each user already has, or can register, an account.

Therefore, in accordance with a first aspect of the present invention, a user is identified between an Authentication Provider and a Service Provider by a shared identity, independently of an authentication identity used between the user and the Authentication Provider, and independently of a user identity used between the user and the Service Provider.

In accordance with a second aspect of the present invention, a Mobile Network Operator (MNO) may act as an SSO Authentication Provider for its own subscribers towards other Service Providers having such agreement with the Mobile Network Operator. In accordance with a third aspect of the invention, a first Service Provider capable of performing an SSO authentication may act as an SSO Authentication Provider towards a number of second Service Providers accepting such SSO authentication from said first Service Providers for a number of users.

One important feature that the present invention is based on is the linking of user identities between an SSO Authentication Provider and a Service Provider where a user is accessing. A first step prior to this identity linking is an authentication of the user with said SSO Authentication Provider. This authentication may be carried out by different mechanisms suitable for Single Sign-On as well as for other services inasmuch as the user obtains a token as a result. The token may be, for example, a Security Assertion Mark-up Language (SAML) artefact, a Passport cookie, a Kerberos token, or others.

Once the user has been authenticated by an SSO Authentication Provider and has thus obtained from the SSO Authentication Provider (SSO AP) an authentication token or artefact, a sequence of actions take place in order to appropriately link different user identities at different entities to achieve the objects of the invention.

Under a currently preferred embodiment of the invention illustrated in FIG. 2, the user presents (S-541) the token to a Service Provider (SP-2) where the user (5) requests access. This token comprises an implicit reference to the user (user Ref.) that is preferably understood only by the SSO Authentication Provider (SSO AP). Given that the Service Provider (SP-2) needs authenticate this user (5), the Service Provider (4) sends (S-411) an authentication query toward the SSO Authentication Provider (SSO AP) (1) to authenticate the user. The Service Provider (4) includes the reference to the user (user Ref.) received in the token along with an identifier of the Service Provider (SP_name).

The SSO AP (1) receiving such authentication request fetches a user's internal identity at the Authentication Provider, namely a user's identity for authentication purpose (AP_ID), and then searches in the user's profile (6) for an identity-entry corresponding to the requester Service Provider (SP_name). Given that no identity-entry exists in the user's profile yet since identity linking has not been performed, the SSO AP (1) generates a temporary alias identity (ALIAS_ID) for identifying the user (5). This step avoids revealing the user's identity used for authentication (AP_ID) to the Service Provider (4). In this manner, both the Service Provider (4) and the SSO Authentication Provider (1) refer to the user with said temporary alias identity (ALIAS_ID).

The SSO AP thus confirms the user's authentication with an authentication response (S-141) to the Service Provider having issued the query, the response including the temporary alias identity (ALIAS_ID). The Service Provider (SP-2) only has knowledge of this identity, and hence it is not aware that it is in fact an alias.

Then, the Service Provider (4) searches (S-471) in its local database (7) for any entry corresponding to the received user identity, namely the temporary alias identity (ALIAS_ID) in this case. As a permanent identity linking has not been performed yet, no entry exists for this identity and the temporary alias identity (ALIAS_ID) is reported (S-741) as unknown. The Service Provider (4) asks (S-451) the requester user (5) for its local identity (SP_ID) and password, which is valid for said Service Provider (4) site basis to authenticate the user locally when the user already has an account with the Service Provider. Upon receipt (S-542) of the user's local identity (SP_ID) and password, such local authentication takes place at the Service Provider. If the user does not have an account it may register for one at this point. This is an additional advantage of this mechanism wherein an on-line registration of a new account can be triggered while carrying out the identity linking process.

At this stage, the Service Provider (4) requests permission (S-412) from the SSO Authentication Provider (1) to link identities locally indicating the temporary alias identity (ALIAS_ID) to be linked. This type of query may be rather expressed in terms of co-ordination of respective linking actions between the SSO Authentication Provider (1) and the Service Provider (4). This step is advantageous in order to avoid that a Service Provider links user identities without explicit consent of the user expressed in the corresponding user profile at the Authentication Provider.

The SSO Authentication Provider consults (S-161) the user's profile to check if said user (ALIAS_ID) has allowed an identity linking at the Service Provider (SP-2) accessed by the user and identified by a given identifier (SP_name). This might be the case where users specify that identity linking should not occur at certain web sites such as adult content sites. At present, if the user has allowed identity linking for the given Service Provider (4), the SSO Authentication Provider updates the user's profile with such user's identity (ALIAS_ID) for the given Service Provider (SP-2) identified by a given identifier (SP_name). The user's profile (6) responds (S-611) with a successful message once the updating has been validly completed, and the SSO Authentication Provider (1) in its turn authorises (S-142) the link operation to the Service Provider (4) having respective link of identity awaiting co-ordination. At this point, the previously considered temporary alias identity can be rather considered a shared identity between the Service Provider and the Authentication Provider.

The Service Provider (4) inserts in its local user's profile the shared identity (ALIAS_ID) along with the user's local identity (SP_ID), which is valid and preferably only known by said Service Provider (4). The Service Provider (4) eventually grants access to the user (5), and from now on it will greet the user with the user's local identity (SP_ID) and the user's account.

These set of actions described above preferably occurs just once when a user accessed a Service Provider at the first time and a token is presented to an SSO Authentication Provider. A next time the user presents a token requesting access to this Service Provider (4), the SSO Authentication Provider (1) authenticates the user's shared identity (ALIAS_ID) for the identifier (SP_name) of said Service Provider as found in the user's profile (6) where the user is internally known by its authentication identity (AP_ID) for which its authentication status can be checked. Then, the Service Provider (4) queries its local user profile database (7) with the shared identity (ALIAS_ID), for which a permanent rather than temporary link has been established, and obtains the local user's identity (SP_ID). After this, the Service Provider grants access to the user with its local user's identity (SP_ID) in a customised manner.

The solution described above and illustrated in FIG. 2 is also applicable and thus solves privacy and identity concealment. This is achieved by the transitory property of the temporary alias identity (ALIAS_ID) generated by the SSO Authentication Provider. In accordance with the above description, if a user does not wish to link permanently its user's identities at certain Service Providers said user may have blacklisted under the SSO Authentication Provider premises a number of web sites. In this case, upon request (S-412) for permission to link user's identities from a Service Provider (4), the SSO Authentication Provider (1) answers with a Deny Link Operation. With this denial, the temporary alias identity (ALIAS_ID) is merely temporary populated in the user's profile (6) at the Authentication Provider side for the given Service Provider (4), or even not populated at all and simply cached for a while. At this stage, it is noticed that the user would most probably skip those steps illustrated in FIG. 2 for providing a local identity (SP_ID) and for registering an account with the Service Provider.

In accordance with the invention there is provided a mechanism whereby user's identities can be unlinked. Therefore, a similar mechanism as the one shown in FIG. 2 takes place with a new authorisation query (S-411) to indicate the Unlinking of identities. Further accesses by the user to the same Service Provider (4) result in a temporary alias identity (ALIAS_ID) to be assigned by the SSO Authentication Provider (1). If the Service Provider requests (S-412) authorisation to Link Identities after having requested the unlinking, the SSO Authentication Provider (1) responds with a deny result.

Under the above embodiment the concept of shared alias identity (ALIAS_ID) was introduced with the intention of being an identity that univocally and simultaneously identifies a user to an SSO Authentication Provider and to a Service Provider. The SSO Authentication Provider is thus able to correlate the shared alias identity (ALIAS_ID) with the user's identity used for authentication (AP_ID) for a user, whereas the Service Provider is able to correlate the shared alias identity (ALIAS_ID) with a local user's identity (SP_ID) for said Service Provider.

At this point certain considerations may be taken into account depending on the value of a user's alias identity (ALIAS_ID). The user's alias identity (ALIAS_ID) may adopt the same format and value for all the Service Providers the user might access to, or might adopt a different format or value for different Service Providers.

The case of adopting a different format or value for different Service Providers has the snag of resulting in high-cost search operations in the user's profile directory (6) when a different user's alias identity per service provider is used to perform the search. It might be preferable in this case to first map the alias identity (ALIAS_ID) to the user's authentication identity (AP_ID) and perform the search with this identity. However, this is apparently feasible only if this correlation is maintained elsewhere, for example, in a Session Manager database as other preferred embodiments suggest as shown in FIG. 3A-3C FIG. 4 and FIG. 5. The Session Manager may correlate a shared alias identity (ALIAS_ID) with the authentication identity (AP_ID) for existing sessions. The Session Manager could also store this correlation temporarily in a local cache even after a session is over. This allows a Service Provider to originate queries concerning a shared alias identity (ALIAS_ID) during or shortly after a session with a resulting low-cost search operation in the user's profile directory (6) at the authentication Provider site. On the other hand, once the alias identity (ALIAS_ID) has been removed from the session manager and local cache, there is no alternative for the Authentication Provider but to search in the user's profile directory with the alias identity (ALIAS_ID). For instance, when a Service Provider wishes to check with the Authentication Provider certain information concerning many users with respective alias identities off-line.

The case of a user's alias identity (ALIAS_ID) adopting the same format and value for all the Service Providers simplifies the search in the Authentication Provider user's profile directory. Such directory lookup operation would be comparable to performing a lookup based on the user's authentication identity (AP_ID) and should not be as costly search-wise as for the previous case. A snag with this approach is the possible ability of Service Providers to carry out a so-called "profile sharing" based on the user's alias identity (ALIAS_ID) without the user's consent. This identity is likely common to a number of Service Providers so that it would be possible for a given Service Provider to query another Service Providers about a certain user identified by said common user's alias identity (ALIAS_ID).

In short and according to another aspect of the present invention, the practitioner may choose between having a user's alias identity (ALIAS_ID) with the same format and value for all the Service Providers, or having different user's alias identities for different Service Providers, without being away from the teachings behind the invention.

Thus, the user's identities linking is the process of correlating user's identities at both the Authentication Provider and a number of Service Providers, and particularly oriented to offer effective Single Sign-On services. Initial conditions for identity linking may be established by a SAML authorisation assertion and embedded in processes of accessing a service provider. In this respect and in accordance with another preferred embodiment of the present invention, FIG. 3A-3C describe the steps appropriate to perform an identity linking via a SAML engine.

As already commented above in respect of the embodiment illustrated in FIG. 2, a first step prior to the identity linking is an authentication of the user at said SSO Authentication Provider in order to obtain a token or artefact. FIG. 3A illustrates an embodiment of this user authentication at an SSO Authentication Provider (SSO AP) which in the present case comprises a Session Manager (8) and an Identity Manager (9). The SSO AP (1; 8, 9) is complemented with an Authentication Provider user's profile directory (6) which may be included in, or in communication with, the SSO AP in both embodiments respectively illustrated in FIG. 2 and FIG. 3A-3C.

For the sake of clarity, the already introduced concept of user's alias identity (ALIAS_ID) per Service Provider, which may be linked on either permanent or temporary basis, is replaced under this embodiment by two identity names to better differentiate whether the linking is permanent or temporary, though said two identity names may be particularly the same. That is, the term Temporary Identity (TMP_ID) refers to a temporary linked user's alias identity (ALIAS_ID) under this embodiment, whereas the term Shared Identity (SHARED_ID) refers to a permanently linked user's alias identity (ALIAS_ID). Moreover, the term Temporary Identity (TMP_ID) might be understood as an implicit reference to the user (user Ref.) presented under the embodiment of FIG. 2, especially in the case that Temporary Identity (TMP_ID) and Shared Identity (SHARED_ID) are not the same identity.

In accordance with the embodiment in FIG. 3A, a user (5) requests authentication (S-581) toward the SSO AP (8, 9) via a Session Manager (8). The Session Manager receiving such authentication request queries (S-891) an Identity Manager (9) device about a user's Shared Identity (SHARED_ID) for the Service Provider (4) where the user (5) has accessed. It must be noticed that the Authentication Provider (1; 8, 9) receives the user's identity for authentication purposes (AP_ID) as well as an identifier of said Service Provider (SP_name) where the user has accessed. Given that this is the first time the user accesses this Service Provider site via Single Sign-On authentication, there is no user's Shared Identity (SHARED_ID) yet for the requested site (SP_name). Hence, when the Identity Manager (9) sends (S-961) a query to the Authentication Provider (hereinafter AP) user's profile (6), such query returns (S-691) a response indicating no entry found. Then, the Identity Manager (9) generates a Temporary Identity (TMP_ID) for the user (5) and correlates it to both the user's authentication identity (AP_ID) and to the identifier (SP_name) of the Service Provider (4) accessed by the user. This correlation may be stored locally by the Identity Manager until either the Temporary Identity (TMP_ID) expires, or identities are permanently linked, in the latter case the Temporary Identity becomes a user's shared identity (SHARED_ID). As a result, an authentication assertion is generated by the Authentication Provider and returned back (S-851) to the Service Provider, namely an authentication artefact, said artefact populated with the Temporary Identity (TMP_ID).

After having presented an embodiment of the prior authentication, a further embodiment for identity linking is described with reference to FIG. 3B and FIG. 3C. This further embodiment provides for having a SAML engine (8a) in co-operation with, or replacing, the above Session Manager (8) for handling assertions for a given user and for a specific destination side, which in the present case may be the Service Provider (4) site.

As shown in FIG. 3B, the user (5) presents (S-541) the obtained authentication artefact to the Service Provider (4) where the user accesses. The Service Provider sends (S-48a1) an Authentication Request message to the SSO AP, for example, via a SAML engine (8a), and based on information received in the artefact. The SAML engine (8a) in co-operation with, or replacing, the above Session Manager (8) responds (S-8a41) with the previous authentication assertion generated for the user's Temporary Identity (TMP_ID). Then, the Service Provider (4) receiving such assertion extracts the user's Temporary Identity (TMP_ID) element from the assertion and lookups (S-471) in its local user profile directory (7) returning back (S-741) an answer of type identity unknown. At this point, the Service Provider asks (S-451) the user for a local identity (SP_ID) and password to authenticate the user locally in case it already has an account at said Service Provider.

Upon provision (S-542) of local identity (SP_ID) and password from the user, FIG. 3C shows that the Service Provider (4) authenticates (S-441) the user locally. In the case the user does not have a valid account at this Service Provider, a new account can be registered at this point in accordance with another aspect of the present invention.

Then, the Service Provider (4) sends a SAML authorisation query (S-48a2) for requesting permission to link identities locally toward the Authentication Provider (8, 9; 8a, 9) via the SAML engine (8a). The query includes the Temporary Identity (TMP_ID) previously received and temporary linked, likely in a local cache. This request of permission may be substituted by a sort or co-ordination between both sites without affecting substantially the scope of the invention. This type of query may be defined via a SAML Authorisation Decision Query with an action field set to indicate linking.

The SAML engine (8a) at the Authentication Provider receives the SAML query and invokes (S-8a91) the Identity Manager (9) to handle the current identity linking process. The Identity Manager (9) checks the user's profile directory (6) with the user's authentication identity (AP_ID) to see whether corresponding user preferences allow a permanent identity linking with the currently accessed Service Provider (4) or not. If the user's preferences allow such permanent linking, either the Temporary Identity (TMP_ID) becomes the Shared Identity (SHARED_ID), or another Shared Identity (SHARED_ID) different from the Temporary Identity (TMP_ID) is seized to this end. This Shared Identity (SHARED_ID) is submitted (S-962) to the AP user's profile directory (6) in order to be linked therein with the identifier (SP_name) of the Service Provider (4)., and with the user's authentication identity (AP_ID). Once such linking has been updated (S-692) in the AP user's profile directory (6), a corresponding linking action is indicated (S-98a1) from the Identity Manager (9) to the SAML engine (8a). In addition, the Identity Manager takes necessary actions for deleting the previous Temporary Identity (TMP_ID) from its local cache, or thus indicates to do toward the user's profile directory (6) in case the temporary linking was carried out therein. The SAML engine responds (S-8a42) to the previous authorisation query from the Service Provider (4) with an authorisation assertion indicating whether identity linking is allowed and, when allowed, including the identity to be linked (SHARED_ID).

The Service Provider (4), on reception (S-8a42) of such linking indication, submits (S-472) the new received user's Shared Identity (SHARED_ID) toward its user's profile directory (7) for linking said Shared Identity with the corresponding user's local identity (SP_ID) at said Service Provider (4). In addition, the Service Provider takes proper actions for deleting the previous Temporary Identity (TMP_ID) from its local cache, or thus indicate to do toward the user's profile directory (7) in case the temporary linking was carried out therein. Once the Service Provider (4) receives (S-742) a successful result of the linking operation from its user's profile directory (7), the user is granted access to the Service Provider (4), the latter greeting the user with the user's local identity (SP_ID) and account.

This embodiment commented above in respect of FIG. 3A-3C preferably occurs only for the first time a user (5) accesses a Service Provider (4) via a Single Sign-On (SSO) authentication. In accordance with the invention, the next time the user accesses the same Service Provider (4), the SSO Authentication Provider (1, 6; 8, 9, 6; 8a, 9, 6) generates an assertion with a shared alias identity (ALIAS_ID; SHARED_ID) populated as a function of the Service Provider (4) accessed by the user. Thanks to this shared alias identity, anonymity of user is achieved between service provider domain and authentication provider domain.

An advantageous embodiment of another aspect of the present invention is illustrated in FIG. 4 wherein an identity selection process is carried out at an Authentication Provider site (1, 6; 8, 8a, 9, 6) for a user (5) being authenticated.

As shown in FIG. 4, a user (5) requests (S-581) authentication by including a user's identity for authentication purposes (AP_ID) in order to further get a granted access to a selected service provider. The Session Manager (8) receiving said request invokes an Identity Manager (9) by asking (S-891) for a Shared Identity (SHARED_ID) with the received user's authentication identity (AP_ID) and with an identifier (SP_name) of the selected Service Provider. The Identity Manager (9) queries (S-961) its user's profile directory (6) in order to retrieve (S-693) a Shared Identity (SHARED_ID) for said user at the selected Service Provider. The Identity Manager returns back (S-982) the Shared Identity (SHARED_ID) to the Session Manager (8). At this point, the Session Manager sends (S-88*a*1) said Shared Identity (SHARED_ID) to a SAML engine (8*a*) for the latter generating an assertion with the received Shared Identity (SHARED_ID). This assertion, also called artefact for the purpose of the present invention, is returned (S-8*a*81) to the requester Session Manager which, in turn, sends it back (S-851) to the user as a successful authentication result.

Under this embodiment the Session Manager (8) correlate a user's set of Shared Identities (SHARED_ID) with identifiers (SP_name) of a corresponding number of Service Providers currently in use throughout a session and a user's authentication identity (AP_ID). This allows for lookups to be done based on said user's authentication identity (AP_ID).

Still another advantageous embodiment of another aspect of the present invention is illustrated in FIG. 5 wherein a generation of a user's Temporary Identity (TMP_ID) for an anonymity service is carried out at an Authentication Provider site (1, 6; 8, 8*a*, 9, 6) for a user (5) being authenticated. Under this embodiment there is provided a solution to cater for anonymity wherein a user (5) wishes to access a Service Provider in an anonymous mode, that is, have a property set to Conceal, and said property populated in the user's profile. The Identity Manager (9) interprets this property and generates a Temporary Identity (TMP_ID) for the user (5) to be used and preferably stored by the Session Manager.

In accordance with the flow depicted in FIG. 5, a user (5) requests authentication (S-581) for a specific service provider and furnishes his user's authentication identity (AP_ID) to a Session Manager (8) at the Authentication Provider site. The Session Manager checks user sessions and requests (S-891) fetching a user's Shared Identity (SHARED_ID) for the specific service provider toward an Identity Manager (9). The Identity manager searches (S-961) its user's profile directory (6) to fetch the user's Shared Identity (SHARED_ID) for the specific service provider. In the present case, user's preferences indicate (S-694) that an identity concealment service has been requested by the user for accessing said specific service provider. Then, the Identity Manager (9) generates (S-991) a user's Temporary Identity (TMP_ID) for said specific service provider, and the Identity Manager (9) stores said user's Temporary Identity (TMP_ID) locally in its local cache with a specified time-to-live value (TTL).

Next, the Identity Manager returns (S-981) said user's Temporary Identity (TMP_ID) back to the Session Manager (8). The Session Manager forwards (S-88*a*1) the user's Temporary Identity (TMP_ID) to the SAML engine (8*a*) for the latter to create an assertion based on said user's Temporary Identity (TMP_ID). As a result an authentication artefact is returned (S-8*a*81) to the Session Manager which, in turn, returns (S-851) such authentication artefact to the user.

Thus, under this embodiment, the Identity Manager assumes the responsibility of generating a Temporary Identity for the user and storing such Temporary Identity locally to be used throughout the session. The Time-To-Live value of this Temporary Identity (TMP_ID) may be specified in advance, or subject to Session Manager premises. In other words, once a user has finished a session the Session Manager instructs the Identity Manager to delete a user's Temporary Identity from the cache. In this case, the Temporary Identity (TMP_ID) is not linked and does not become a Shared identity (SHARED_ID).

Applicant's invention is described above in connection with various embodiments that are intended to be illustrative and non-restrictive. It is expected that those of ordinary skill in this art may modify these embodiments. The scope of Applicant's invention is defined by the claims in conjunction with the description and drawings, and all modifications that fall within the scope of these claims are intended to be included therein.

The invention claimed is:

1. A method of handling and correlating a plurality of user-identities for a user having a plurality of local user-identities utilized to access a plurality of Service Providers, said method providing Single Sign-On services to the user when accessing a selected Service Provider from the plurality of Service Providers, the method comprising the steps of:

authenticating the user at an Authentication Provider with a user-identity used for authentication purposes;

providing the user with a token as proof that the user has already been authenticated by the Authentication Provider;

attempting a first access by the user at the selected Service Provider, said attempting step including presenting the token to the selected Service Provider along with a local user-identity valid for the selected Service Provider;

assigning at the Authentication Provider, a temporary alias-identity to the user to be utilized for a subsequent access of the user at the selected Service Provider identified by a given Service Provider identifier;

respectively linking the user-identity used for authentication purposes and the assigned alias-identity at the Authentication Provider and the local user-identity and the assigned alias-identity at the selected Service Provider, both Providers sharing and uniquely exchanging the alias-identity to identify the user at respective sites, said linking being performed on a permanent basis if allowed by the user or on a temporary basis if not allowed by the user;

providing the user with access by the selected Service Provider based on the shared alias-identity;

determining at a later time, that the user is attempting a subsequent access at the selected Service Provider; and identifying the user by the shared alias-identity and providing access, if permanent linking was allowed by the user; or repeating the steps of assigning a temporary alias-identity, linking on a temporary basis, and providing access, if permanent linking was not allowed by the user.

2. The method of claim 1 wherein the linking step includes checking corresponding preferences of the user at an Authentication Provider user's profile.

3. The method of claim 1 wherein the step of attempting a first access by the user includes providing a password to identify the user locally at the Service Provider.

4. The method of claim 1 wherein a second user not having yet an account with the Service Provider can provide a selected local identity and password to register an account with said Service Provider.

5. The method of claim 1 wherein the step e) of linking respective user identities on a permanent basis includes the linking at the Authentication Provider the user-identity used for authentication purposes with the assigned alias-identity and with the selected Service Provider's given identifier.

6. The method of claim 5 wherein the step of linking the local user-identity and the assigned alias-identity at the selected Service Provider also includes linking an identifier of the Authentication Provider.

7. An Authentication Provider for carrying out a Single Sign-On authentication of a user accessing a selected Service Provider from a plurality of Service Providers utilized by the user, the user having a user-identity used for authentication purposes, the Authentication Provider comprising:
    means for authenticating the user with a user-identity used for authentication purposes;
    means for providing the user with a token as proof that the user has already been authenticated:
    means for assigning a temporary alias-identity to the user to be utilized for a subsequent access of the user at the selected Service Provider identified by a given Service Provider identifier;
    means for assigning a temporary alias-identity to the user to be utilized the selected Service Provider identified by a given Service Provider identifier;
    means for linking the assigned alias-identity with the user-identity used for authentication purposes and with the Service Provider identifier of the selected Service Provider, said linking being performed on a permanent basis if allowed by the user or on a temporary basis if not allowed by the user: and
    means for authenticating the user's linked alias-identity towards the selected Service Provider whenever the user attempts a subsequent access at the selected Service Provider, if permanent linking was allowed.

8. The Authentication Provider of claim 7, further comprising a Session Manager that includes:
    means for determining whether a user identified by an authentication user-identity has an active session;
    means for determining whether there is a linked alias-identity for the user with a session in a Service Provider; and
    means for ordering the generation of an authentication assertion with the linked alias-identity for the user.

9. The Authentication Provider of claim 8, further comprising a Security Assertion Mark-up Language engine for generating an authentication assertion with a linked alias-identity for a user.

10. The Authentication Provider of claim 7, further comprising an Identity Manager that includes:
    means for determining whether a linked alias-identity exists for a user in a Service Provider;
    means for assigning a new alias-identity to the user; and
    means for linking the new alias-identity for the user in a Service Provider with an identifier of said Service Provider and with the user's authentication user-identity.

11. The Authentication Provider of claim 10, further comprising an Identity Manager for determining the user's preferences regarding linking of the user's identities.

12. The Authentication Provider of claim 7, further comprising a user's profile directory that stores the links of the user's identities with the identifiers of Service Providers.

13. A Service Provider comprising:
    means for receiving a first service request from an accessing user. the first service request including an authentication token for the user that indicates that the user has already been authenticated;
    means for verifying the authentication token with an Authentication Provider that generated the token, and
    means for obtaining from the user, a local user-identity to identify a users account with the Service Provider
    means for obtaining from the Authentication Provider a shared alias-identity for the user;
    means for linking the local user-identity with the received shared alias-identity, on a permanent basis if allowed by the user, or on a temporary basis if not allowed by the user;
    means for receiving a subsequent service request from the accessing user identifying the user's shared alias-identity: and
    means for requesting the Authentication Provider to authenticate the user's shared alias-identity whenever the user subsequently requests access, if permanent linking was allowed.

14. The Service Provider of claim 13 further comprising means for registering a new user's account with the Service Provider for a user not having a local user-identity assigned to any account with the Service Provider.

15. The Service Provider of claim 13 further comprising means for linking an identifier of the Authentication Provider with the local user-identity and with the received shared alias-identity.

* * * * *

UNITED STATES PATENT AND TRADEMARK OFFICE
CERTIFICATE OF CORRECTION

PATENT NO. : 7,296,290 B2 Page 1 of 1
APPLICATION NO. : 10/504954
DATED : November 13, 2007
INVENTOR(S) : Barriga et al.

It is certified that error appears in the above-identified patent and that said Letters Patent is hereby corrected as shown below:

On the Title Page, in Item (75), under "Inventors", in Column 1, Line 1, delete "Skarpnack" and insert -- Skarpnäck --, therefor.

In Column 14, Line 62, in Claim 5, after "includes" delete "the".

In Column 15, Line 11, in Claim 7, delete "authenticated:" and insert -- authenticated; --, therefor.

In Column 15, Line 24, in Claim 7, delete "user:" and insert -- user; --, therefor.

In Column 16, Line 7, in Claim 11, after "determining" delete "the".

In Column 16, Line 15, in Claim 13, delete "user." and insert -- user, --, therefor.

In Column 16, Line 21, in Claim 13, delete "users" and insert -- user's --, therefor.

In Column 16, Line 21, in Claim 13, after "Provider" insert -- ; --.

In Column 16, Line 29-30, in Claim 13, delete "identity:" and insert -- identity; --, therefor.

Signed and Sealed this

Ninth Day of September, 2008

JON W. DUDAS
*Director of the United States Patent and Trademark Office*